United States Patent
Wang

(10) Patent No.: US 12,361,529 B2
(45) Date of Patent: Jul. 15, 2025

(54) TRAINING DATA GENERATION METHOD, METHOD AND DEVICE FOR GENERATING LEARNED MODEL, RECORDING MEDIUM, PROGRAM, AND INFORMATION PROCESSING DEVICE

(71) Applicant: Leader Electronics Corp., Yokohama (JP)

(72) Inventor: Xiaodong Wang, Kanagawa (JP)

(73) Assignee: Leader Electronics Corp., Yokohama (JP)

( * ) Notice: Subject to any disclaimer, the term of this patent is extended or adjusted under 35 U.S.C. 154(b) by 612 days.

(21) Appl. No.: 17/755,778

(22) PCT Filed: Sep. 17, 2020

(86) PCT No.: PCT/JP2020/035212
§ 371 (c)(1),
(2) Date: May 6, 2022

(87) PCT Pub. No.: WO2021/090587
PCT Pub. Date: May 14, 2021

(65) Prior Publication Data
US 2022/0394200 A1     Dec. 8, 2022

(30) Foreign Application Priority Data
Nov. 8, 2019   (JP) .................. 2019-202889

(51) Int. Cl.
*G06K 9/00* (2022.01)
*G06T 7/00* (2017.01)

(52) U.S. Cl.
CPC .. *G06T 7/0002* (2013.01); *G06T 2207/20081* (2013.01); *G06T 2207/20084* (2013.01)

(58) Field of Classification Search
CPC . G06T 2207/20084; G06T 2207/20081; G06T 7/0012; G06T 7/0004;
(Continued)

(56) References Cited

U.S. PATENT DOCUMENTS

2018/0211374 A1   7/2018   Tanaka et al.
2018/0225166 A1   8/2018   Maya et al.
(Continued)

FOREIGN PATENT DOCUMENTS

JP    H08-320251 A      12/1996
JP    2018-120300        8/2018
(Continued)

OTHER PUBLICATIONS

M. Yan, X. Jiang and J. Yuan, "3D Convolutional Generative Adversarial Networks for Detecting Temporal Irregularities in Videos," 2018 24th International Conference on Pattern Recognition (ICPR), Beijing, China, 2018, pp. 2522-2527 (Year: 2018).*

(Continued)

*Primary Examiner* — Alex Kok S Liew
(74) *Attorney, Agent, or Firm* — Klarquist Sparkman, LLP

(57) ABSTRACT

To generate training data based on normal content and anomalous content generated from the normal content. A training data generation method for generating training data used for generating a learned model for determining whether there is an anomaly in an inspection target, the training data generation method including: receiving normal content regarding the inspection target and anomalous content generated from the normal content; and generating training data based on a set of the normal content and one or more pieces of the anomalous content.

5 Claims, 15 Drawing Sheets

(58) Field of Classification Search
CPC ......... G06T 7/0002; G06T 7/001; G06T 7/11;
G06T 2207/10016; G06T 7/0008; G06T
2207/10081; G06T 2207/10116; G06T
2207/10024; G06T 2207/20076; G06T
2207/30004; G06T 2207/30164; G06T
2207/10088; G06T 2207/10132; G06T
2207/30108; G06T 7/0014; G06T 7/70;
G06T 3/40; G06T 7/12; G06T
2207/10104; G06T 2207/30168; G06T
2207/30016; G06T 5/50; G06T 7/00;
G06T 2207/30141; G06T 5/60; G06T
2200/24; G06T 2207/10072; G06V 10/82;
G06V 10/764; G06V 10/454; G06V
10/774; G06V 20/52; G06V 2201/03;
G06V 10/25; G06V 10/776; G06V
10/761; G06V 20/44; G06V 20/70; G06V
10/751; G06V 2201/06; G06V 10/762;
G06V 20/41; G06V 20/698; G06V
30/19173; G06F 18/214; G06F 18/22;
G06F 18/217
See application file for complete search history.

(56) References Cited

U.S. PATENT DOCUMENTS

| 2021/0019878 | A1  | 1/2021 | Izawa    |           |
|--------------|-----|--------|----------|-----------|
| 2023/0036068 | A1* | 2/2023 | Gurevich | G16H 50/30 |
| 2023/0281986 | A1* | 9/2023 | Peng     | G06N 3/08 |

FOREIGN PATENT DOCUMENTS

| JP | 2018-124937 A  | 8/2018  |
| JP | 2018-206262 A  | 12/2018 |
| WO | 2019/188040 A1 | 10/2019 |

OTHER PUBLICATIONS

Liu, "Future Frame Prediction for Anomaly Detection—A New Baseline," CVPR, IEEE 2018 (Year: 2018).*
Z. W. Wang, W. Jiang, K. He, B. Shi, A. Katsaggelos and O. Cossairt, "Event-Driven Video Frame Synthesis," 2019 IEEE/CVF International Conference on Computer Vision Workshop (ICCVW), Seoul, Korea (South), 2019 (Year: 2019).*
Daisukelab, "Spotting Defects!—Deep Metric Learning Solution For MVTec Anomaly Detection Dataset," (in Japanese) downloaded from https://qiita.com/daisukelab/items/e0ff429bd58b2befbb1b, 17 pp. (with English translation, 16 pp.) document marked Sep. 16, 2019.
Written Opinion (in Japanese) dated Aug. 12, 2020, from International Patent Application No. PCT/JP2020/035212, 5 pp.
International Search Report dated (in Japanese) Aug. 12, 2020, from International Patent Application No. PCT/JP2020/035212, 4 pp. (with English translation, 3 pp.).
Extended European Search Report from European Application No. 20884205.4, dated Sep. 22, 2023, 11 pages.
Hasan et al., "Learning Temporal Regularity in Video Sequences," 2016 IEEE Conference on Computer Vision and Pattern Recognition, 10 pp. (2016).

* cited by examiner

Fig. 8

| ERROR LIST | | | |
|---|---|---|---|
| NUMBER | TIME | PREVIEW | CONFIDENCE |
| 1 | 00:00:01.36 | | 99.31% |
| 2 | 00:00:07.38 | | 99.90% |
| 3 | 00:00:23.70 | | 99.67% |

Fig. 10A
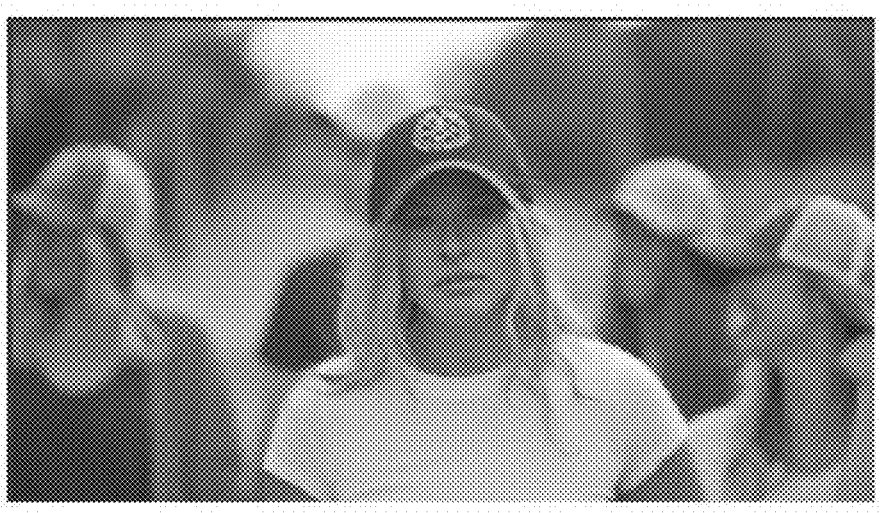

Fig. 10B
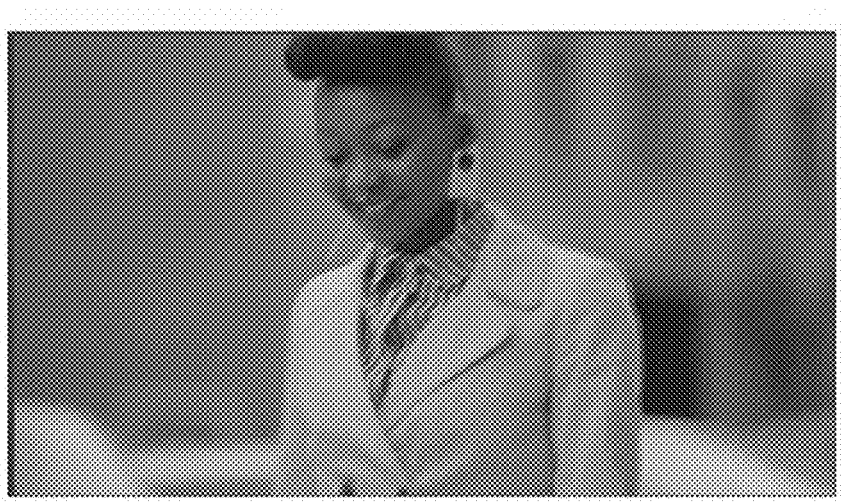

Fig. 10C
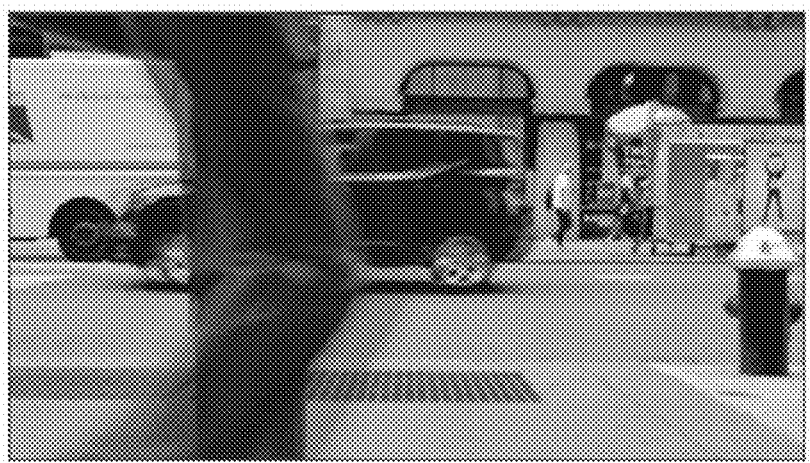
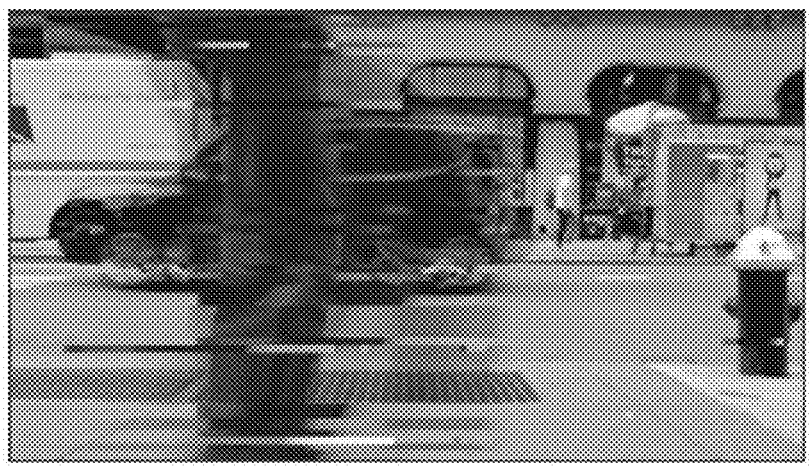

Fig. 10D
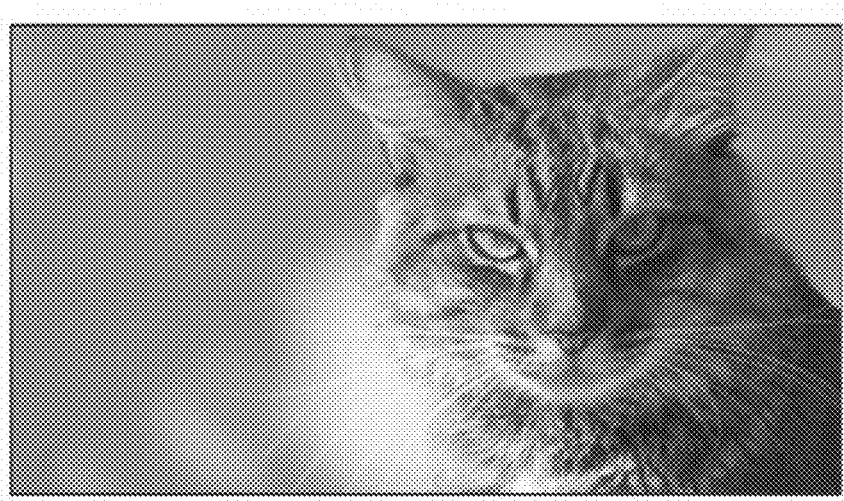
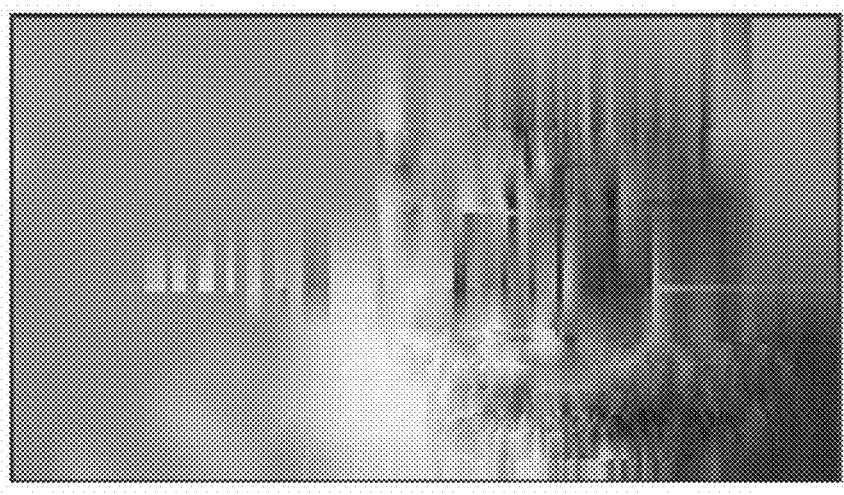

(a) NORMAL  (b) CLICK NOISE (a) NORMAL     (b) CONTINUOUS
                   SINE WAVE

TRAINING DATA GENERATION METHOD, METHOD AND DEVICE FOR GENERATING LEARNED MODEL, RECORDING MEDIUM, PROGRAM, AND INFORMATION PROCESSING DEVICE

CROSS REFERENCE TO RELATED APPLICATIONS

This is the U.S. National Stage of International Application No. PCT/JP2020/035212, filed Sep. 17, 2020, which was published in Japanese under PCT Article 21 (2), which in turn claims priority to Japanese Application No. 2019-202889, filed Nov. 8, 2019, both of which are incorporated herein by reference in their entirety.

TECHNICAL FIELD

The present disclosure relates to a training data generation method, a method and a device for generating a learned model, a recording medium, a program, and an information processing device.

BACKGROUND ART

Content providers and the like are obliged to deliver high-quality content to consumers. The content provider such as a broadcasting station needs to check whether there is an anomaly in the quality of video content before providing the video content. Therefore, conventionally, it has been necessary to display content images on a monitor device, and have a specialized person in charge of inspection carefully monitor the displayed content images to see if there is any quality anomaly of the images.

However, with the way of inspecting the anomaly in the content images described above, there is a large mental and physical burden imposed upon the person in charge, and there are individual differences in detection of anomalies in the images. Meanwhile, there is a method with which the quality anomaly is mechanically detected without the help of a person. However, it is necessary to use detection software for detecting the anomaly and to set threshold values respectively for a plurality of parameters used for the detection, so that there may be a difference generated in detection of anomalies depending on how the threshold values are set.

Recently, algorithms of machine learning are used for detecting anomalies in images. The system disclosed in PTL 1 includes: a first learning unit that discriminates normal data; and a second learning unit that identifies correct data and incorrect data, with the correct data being an anomaly candidate selected by a user, and the incorrect data being an unselected anomaly candidate.

CITATION LIST

Patent Literature

PTL 1: Japanese Patent Laid-Open No. 2018-120300

SUMMARY OF INVENTION

Technical Problem

With the machine learning described above, however, it is necessary for the user to select the anomaly candidate, so that it takes a large amount of time and cost for making the selection.

Solution to Problem

Therefore, an aspect of the present disclosure is a training data generation method for generating training data used for generating a learned model for determining whether there is an anomaly in an inspection target, the training data generation method including: receiving normal content regarding the inspection target and anomalous content generated from the normal content; and generating training data based on a set of the normal content and one or more pieces of the anomalous content.

Furthermore, another aspect of the present disclosure is a generation method for generating a learned model for determining whether content is normal or anomalous, the generation method including, for generating the learned model: receiving normal content and anomalous content generated from the normal content; and performing machine learning of a learning model by using a set of the normal content and one or more pieces of the anomalous content, and information indicating whether the content is normal or anomalous as training data.

Furthermore, still another aspect of the present disclosure is a generation device for generating a learned model for determining whether content is normal or anomalous, the generation device including: a memory that records an instruction; and a processor that executes the instruction recorded in the memory, wherein the processor executes the instruction to: receive normal content and anomalous content generated from the normal content; and perform machine learning by using a set of the normal content and one or more pieces of the anomalous content, and information indicating whether the content is normal or anomalous as training data.

Yet another aspect of the present disclosure is a non-transitory recording medium recording a program to be executed by a processor, the processor executing the program recorded in the recording medium to: receive normal content and anomalous content generated from the normal content; and perform machine learning by using a set of the normal content and one or more pieces of the anomalous content, and information indicating whether the content is normal or anomalous as training data.

Furthermore, another aspect of the present disclosure is a program executed by a processor, the processor executing the program to: receive normal content and anomalous content generated from the normal content; and perform machine learning by using a set of the normal content and one or more pieces of the anomalous content, and information indicating whether the content is normal or anomalous as training data.

Still another aspect of the present disclosure is a method for determining whether inspection-target content as an inspection target includes an anomaly, the method including: giving the inspection-target content as input data to a learned model for determining whether the inspection-target content is normal or anomalous, the learned model being generated by using a set of the normal content and one or more pieces of anomalous content generated from the normal content, and information indicating whether the content is normal or anomalous as training data; and acquiring information indicating normal/anomaly of the inspection-target content from the learned model to which the inspection-target content is given.

Furthermore, yet another aspect of the present disclosure is an information processing device for determining whether inspection-target content as an inspection target includes an anomaly, the information processing device including: a memory that records an instruction; and a processor that executes the instruction recorded in the memory, wherein the processor executes the instruction to: give the inspection-target content as input data to a learned model for determining whether the inspection-target content is normal or anomalous, the learned model being generated by using a set of the normal content and one or more pieces of the anomalous content generated from the normal content, and information indicating whether the content is normal or anomalous as training data; and acquire information indicating normal/anomaly of the inspection-target content from the learned model to which the inspection-target content is given.

Furthermore, another aspect of the present disclosure is a non-transitory recording medium recording a program to be executed by a processor, the processor executing the program recorded in the recording medium to: give the inspection-target content as input data to a learned model for determining whether the inspection-target content is normal or anomalous, the learned model being generated by using a set of the normal content and one or more pieces of the anomalous content generated from the normal content, and information indicating whether the content is normal or anomalous as training data; and acquire information indicating normal/anomaly of the inspection-target content from the learned model to which the inspection-target content is given.

Furthermore, still another aspect of the present disclosure is a program executed by a processor, the processor executing the program to: give the inspection-target content as input data to a learned model for determining whether the inspection-target content is normal or anomalous, the learned model being generated by using a set of the normal content and one or more pieces of anomalous content generated from the normal content, and information indicating whether the content is normal or anomalous as training data; and acquire information indicating normal/ anomaly of the inspection-target content from the learned model to which the inspection-target content is given.

While various aspects and embodiments related to devices, circuits, and methods are described hereinafter, those are merely examples and for illustrative purposes only and not intended to limit the ranges thereof. While one or more of the issues mentioned above may be suppressed or eliminated with the various embodiments, there may also be other embodiments directed to other improvement.

EMBODIMENTS OF PRESENT DISCLOSURE

First, the content of the embodiments of the present disclosure will be listed and described. The embodiments of the present disclosure include following configuration.

(Item 1) A training data generation method for generating training data used for generating a learned model for determining whether there is an anomaly in an inspection target, the training data generation method including: receiving normal content regarding the inspection target and anomalous content generated from the normal content; and generating training data based on a set of the normal content and one or more pieces of the anomalous content.

(Item 2) A method for generating a learned model by using the training data generated by the training data generation method according to item 1.

(Item 3) A generation method for generating a learned model for determining whether content is normal or anomalous, the generation method including, for generating the learned model: receiving normal content and anomalous content generated from the normal content; and performing machine learning of a learning model by using a set of the normal content and one or more pieces of the anomalous content, and information indicating whether the content is normal or anomalous as training data.

(Item 4) The method according to any one of items 1 to 3, wherein the anomalous content is content acquired by adding an anomaly to the normal content by using an arbitrary application, manually, or both by using the arbitrary application and manually.

(Item 5) The method according to item 4, wherein: the content is video or still picture content; the anomalous content is acquired by adding a digital noise to the normal content; and the digital noise is at least one selected from a group consisting of a block noise, a deviation, a line noise, an afterimage noise, and an image distortion added by using the arbitrary application, and a digital noise added manually.

(Item 6) The method according to item 4, wherein: the content is audio content; the anomalous content is acquired by adding a digital noise to the normal content; and the digital noise is at least one selected from a group consisting of a clipping noise, an impulse noise, a continuous sine wave, and mute added by using the arbitrary application, and a digital noise added manually.

(Item 7) A generation device for generating a learned model for determining whether content is normal or anomalous, the generation device including: a memory that records an instruction; and a processor that executes the instruction recorded in the memory, wherein the processor executes the instruction to: receive normal content and anomalous content generated from the normal content; and perform machine learning by using a set of the normal content and one or more pieces of the anomalous content, and information indicating whether the content is normal or anomalous as training data.

(Item 8) A non-transitory recording medium recording a program to be executed by a processor, the processor executing the program recorded in the recording medium to: receive normal content and anomalous content generated from the normal content; and perform machine learning by using a set of the normal content and one or more pieces of the anomalous content, and information indicating whether the content is normal or anomalous as training data.

(Item 9) A program executed by a processor, the processor executing the program to: receive normal content and anomalous content generated from the normal content; and perform machine learning by using a set of the normal content and one or more pieces of the anomalous content, and information indicating whether the content is normal or anomalous as training data.

(Item 10) A method for determining whether inspection-target content as an inspection target includes an anomaly, the method including: giving the inspection-target content as input data to a learned model for determining whether the inspection-target content is normal or anomalous, the learned model being generated by using a set of the normal content and one or more pieces of anomalous content generated from the normal content, and information indicating whether the content is normal or anomalous as training data; and acquiring information indicating normal/ anomaly of the inspection-target content from the learned model to which the inspection-target content is given.

(Item 11) The method according to item 10, wherein the information indicating normal/anomaly of the inspection-target content includes generation time of a noise in the inspection-target content and a probability of the inspection-target content having an anomaly.

(Item 12) The method according to item 11, further including: determining that the inspection target includes an anomaly when the probability of the inspection-target content having the anomaly is equal to or more than a threshold value, wherein the threshold value is adjusted so as not to mistakenly determine that the inspection-target content has no anomaly even though the inspection-target content actually includes an anomaly.

(Item 13) An information processing device for determining whether inspection-target content as an inspection target includes an anomaly, the information processing device including: a memory that records an instruction; and a processor that executes the instruction recorded in the memory, wherein the processor executes the instruction to: give the inspection-target content as input data to a learned model for determining whether the inspection-target content is normal or anomalous, the learned model being generated by using a set of the normal content and one or more pieces of the anomalous content generated from the normal content, and information indicating whether the content is normal or anomalous as training data; and acquire information indicating normal/anomaly of the inspection-target content from the learned model to which the inspection-target content is given.

(Item 14) The information processing device according to item 13, further including: an input unit that receives input of the inspection-target content; and a display that displays the information indicating normal/anomaly of the inspection-target content.

(Item 15) The information processing device according to item 13, further including a communication unit that performs transmission and reception of information to/from a user terminal, wherein the processor executes the instruction stored in the memory to: receive the inspection-target content transmitted from the user terminal via the communication unit: and transmit the information indicating normal/anomaly of the inspection-target content acquired from the learned model to the user terminal by the communication unit.

(Item 16) A non-transitory recording medium recording a program to be executed by a processor, the processor executing the program recorded in the recording medium to: give the inspection-target content as input data to a learned model for determining whether the inspection-target content is normal or anomalous, the learned model being generated by using a set of the normal content and one or more pieces of the anomalous content generated from the normal content, and information indicating whether the content is normal or anomalous as training data; and acquire information indicating normal/anomaly of the inspection-target content from the learned model to which the inspection-target content is given.

(Item 17) A program executed by a processor, the processor executing the program to: give the inspection-target content as input data to a learned model for determining whether the inspection-target content is normal or anomalous, the learned model being generated by using a set of the normal content and one or more pieces of anomalous content generated from the normal content, and information indicating whether the content is normal or anomalous as training data; and acquire information indicating normal/anomaly of the inspection-target content from the learned model to which the inspection-target content is given.

In addition to the illustrative embodiments and aspects described above, other embodiments and aspects may occur to those skilled in the art by referring to the accompanying drawings and studying the following explanations.

BRIEF DESCRIPTION OF DRAWINGS

FIG. 8 is a diagram illustrating a display screen displayed on a display of a user terminal included in the inference system illustrated in FIG. 5.

FIGS. 10A-10D are some examples of a pair of normal content and anomalous content, in a case where the normal content is a still image.

DESCRIPTION OF EMBODIMENTS

Figure 1:
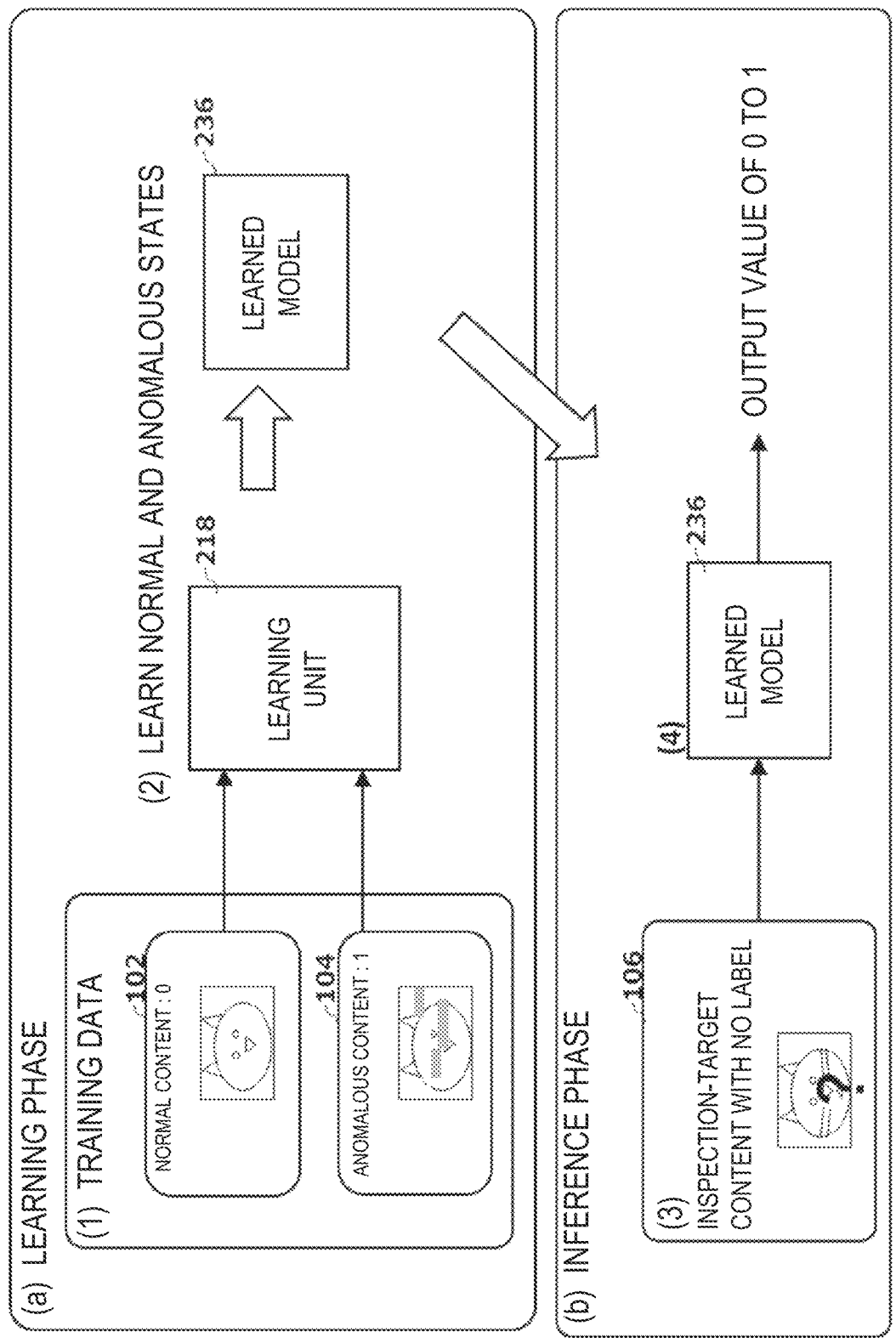
FIG. 1 is a diagram illustrating an outline of a content anomaly inspection method according to an embodiment of the present disclosure for determining whether there is an anomaly in the content.

Hereinafter, embodiments of the present disclosure will be described with reference to the accompanying drawings. In the drawings, same or similar reference signs are applied to same or similar components, and duplicated explanations regarding the same or similar components may be avoided in the description of each of the embodiments. Furthermore, features discussed in each of the embodiments can be applied to other embodiments as long as there is no contradiction with respect to each other. Note, however, that the embodiments of the present disclosure are not necessarily limited to such modes. It is easily occurred to those skilled in the art that the embodiments of the present disclosure can be in various modes within the scope of the appended claims.

Hereinafter, a learned model generation device, and an anomaly inspection method and the like for determining whether there is an anomaly in an inspection target will be described as the embodiments of the present disclosure with reference to the accompanying drawings. In the present disclosure, "anomaly" may be anything that is not normal. Furthermore, the anomaly may include something acquired by adding an artificial change to a normal state, such as something acquired by adding a noise to a normal state and something a person cannot perceive as normal, for example. Furthermore, not only those that change over time but also those that do not change over time may be considered as the inspection target. While there are video content and audio content as examples of the inspection target, the inspection target is not limited thereto. Any devices (for example, a drive device, a processing machine) or signals and the like generated from those devices may be the inspection target. In that case, the content used for inspection may be content such as signals and the like output from the inspection-target devices, and signals output from the sensors attached to the inspection-target devices (for example, acceleration signals output from an acceleration sensor, angular velocity signals output from an angular velocity sensor).

In the embodiments described hereinafter, described is an example of a case where the inspection target is video content and audio content broadcasted from a broadcasting station.

FIG. 1 is a diagram illustrating an outline of a content anomaly inspection method for determining whether there is an anomaly in the content as the inspection target by using machine learning. Machine learning includes deep learning, SVM (support vector machine), convolution neural network (CNN), and the like. FIG. 1(a) illustrates a learning phase of the content anomaly inspection method, which performs learning by having normal content and anomalous content generated from the normal content as training data.

(1) First, normal content is acquired, and the acquired normal content and a large amount of anomalous content corresponding to the normal content are prepared. Anomalous content is the content acquired by adding an anomaly to the normal content, and it can be artificially generated based on the normal content. A label indicating as being normal such as "0", for example, is given to the normal content, and a label indicating as being anomalous such as "1", for example, is given to the anomalous content.

(2) A learned model is generated by learning a large amount of labeled normal content and anomalous content in pairs and automatically optimizing the model such that the output when learning data is input comes to be a value close to a correct answer. In the embodiment, the model is trained to output "0" when normal content is input, and to output "1" when anomalous content is input. For example, in a case where the convolution neural network is employed, a large amount of labeled normal content and labeled anomalous content in pairs are learned, feature amounts are automatically extracted, and weighting and the like of the relations between the nodes of the neural network are adjusted. Such adjustment is repeatedly performed so that the output value gradually reaches the correct value.

FIG. 1(b) illustrates an inference phase of the content anomaly inspection method for making inference whether there is an anomaly included in the inspection target by using a generated learned model 236.

(3) Inspection-target content 106 with no label is prepared from the inspection target. At that time, when the inspection target is not in a form that can be input to the learned model 236, conversion processing for the form that can be input may be performed to prepare the inspection-target content 106.

(4) The inspection-target content 106 is input to the learned model 236. The learned model 236 outputs information indicating whether there is an anomaly included in the inspection-target content 106. For example, it is predicted that there is no anomaly in the inspection-target content 106 when "0" is output, and that there is an anomaly when "1" is output.

As described, according to the present disclosure, it is possible to determine whether there is an anomaly included in the inspection target by using the normal content and the anomalous content generated based on the normal content. Hereinafter, the learning phase will be described in detail by referring to FIG. 2 and FIG. 3.

Figure 2:
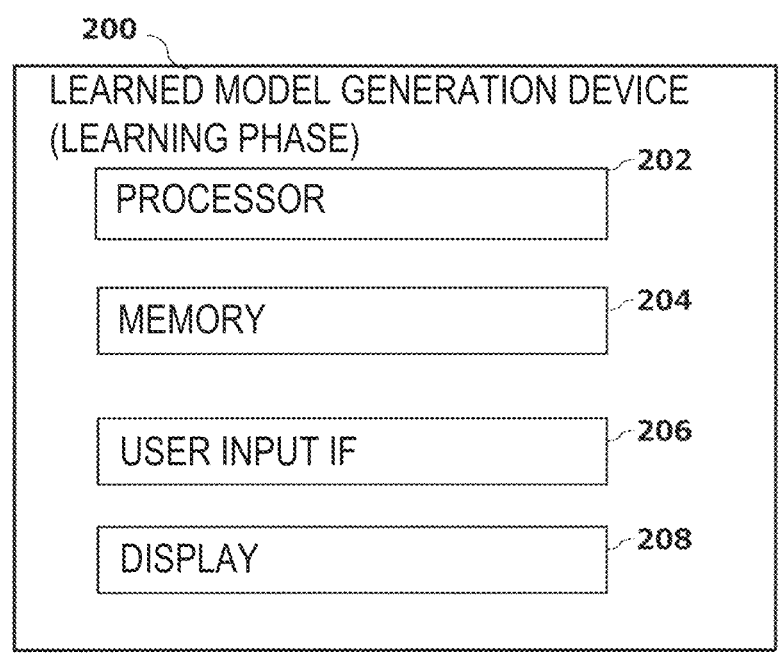
FIG. 2 is a block diagram illustrating an example of a hardware configuration of a learned model generation device according to an embodiment of the present disclosure for performing a learning phase of the content anomaly inspection method illustrated in FIG. 1.

FIG. 2 illustrates an example of a hardware configuration of a learned model generation device 200 as an information processing device that executes the learning phase (1) illustrated in FIG. 1. The learned model generation device 200 is a terminal used for performing machine learning, and it is configured with a personal computer, a work station, or any other information processing device, for example. As illustrated, the learned model generation device 200 includes a processor 202, a memory 204, a user input interface (IF) 206, and a display 208 as the main hardware components. Each of those components is connected to be able to communicate with each other via a bus (not illustrated).

In the memory 204, at least an operating system and a learning model generation program are stored. The operating system is a computer program for controlling overall operations of the learned model generation device 200. The learned model generation program is a computer program for the learned model generation device 200 to implement each processing included in learned model generation processing to be described later. The memory 204 can also temporarily or permanently store data generated by the operations of the learned model generation device 200. Specific examples of the memory 204 include a ROM (Read Only Memory), a RAM (Random Access Memory), a hard disk, a flash memory, an optical disc, and any other storage device.

The processor 202 is configured to read out the program stored in the memory 204 and to execute the processing according thereto. By executing the learned model generation program stored in the memory 204 with the processor 202, each processing of the learned model generation processing to be described later is implemented. The processor 202 includes a CPU (Central Processing Unit) and a GPU (Graphics Processing Unit).

The user input interface 206 is configured to receive input from the user for operating the learned model generation device 200. Specific examples of the user input interface 206 include a keyboard, a mouse, a touch pad, and the like.

The display 208 is configured to provide visual information to the user of the learned model generation device 200. For example, the display 208 displays a plurality of icons for starting various applications on a home screen or a desktop screen of the operating system of the learned model generation device 200 stored in the memory 204. As an example, it is possible to use a liquid crystal display or an organic EL display as the display 208.

Figure 3:
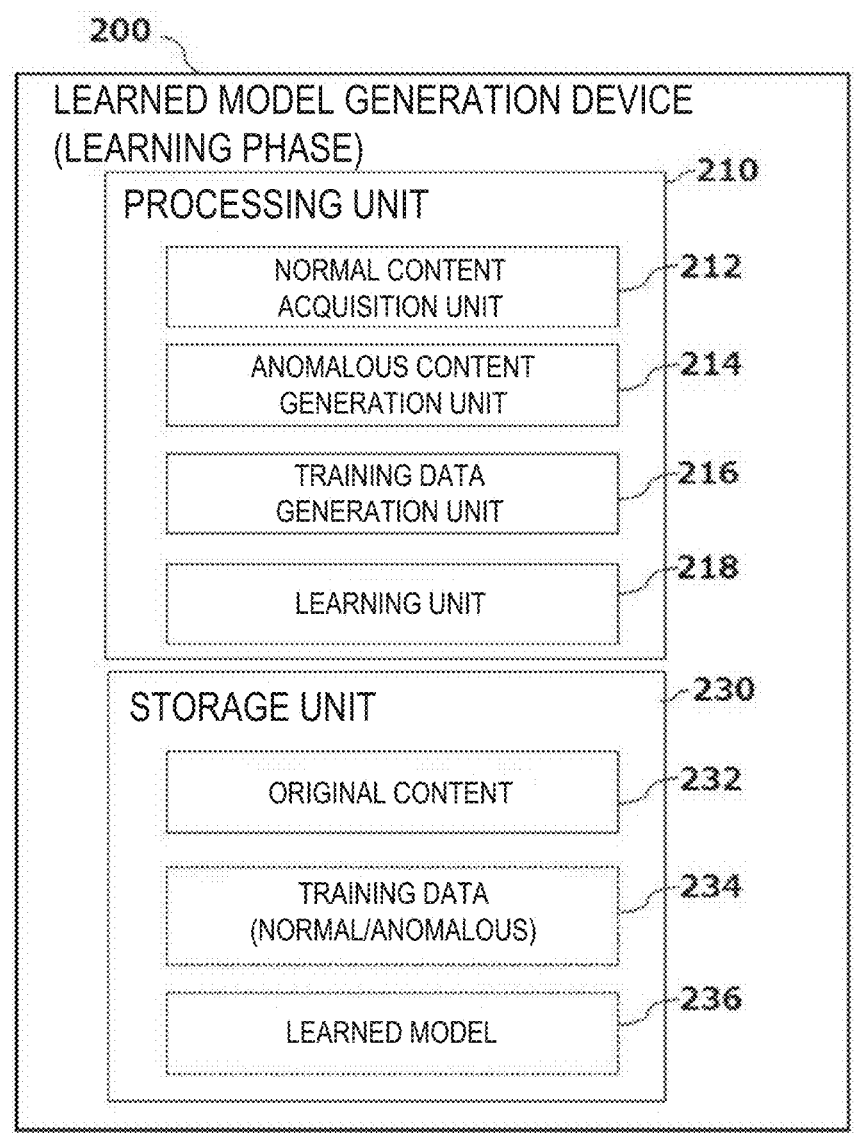
FIG. 3 is a block diagram illustrating a functional configuration of the learned model generation device illustrated in FIG. 2.

FIG. 3 is a block diagram illustrating a functional configuration of the learned model generation device 200 illustrated in FIG. 2. The learned model generation device 200 includes a processing unit 210 and a storage unit 230. The processing unit 210 further includes a normal content acquisition unit 212, an anomalous content generation unit 214, a training data generation unit 216, and a learning unit 218. The storage unit 230 corresponds to the memory 204 illustrated in FIG. 2. The processing unit 210 and each of the units 212 to 216 included in the processing unit 210 are the functions implemented by the learned model generation processing according to the present disclosure, which are implemented by the processor 202 illustrated in FIG. 2 by reading out and executing the learned model generation program stored in the memory 204.

The storage unit 230 stores original content 232 that includes no anomaly, and training data 234. The training data is generated based on the normal content and anomalous content. The original content may be data acquired from the Internet or a public database or the like, data with no anomaly recorded by the user, or may be configured with a large amount of data. The original content is video content when the inspection target is a video, and it is audio content when the inspection target is an audio.

Figure 4:
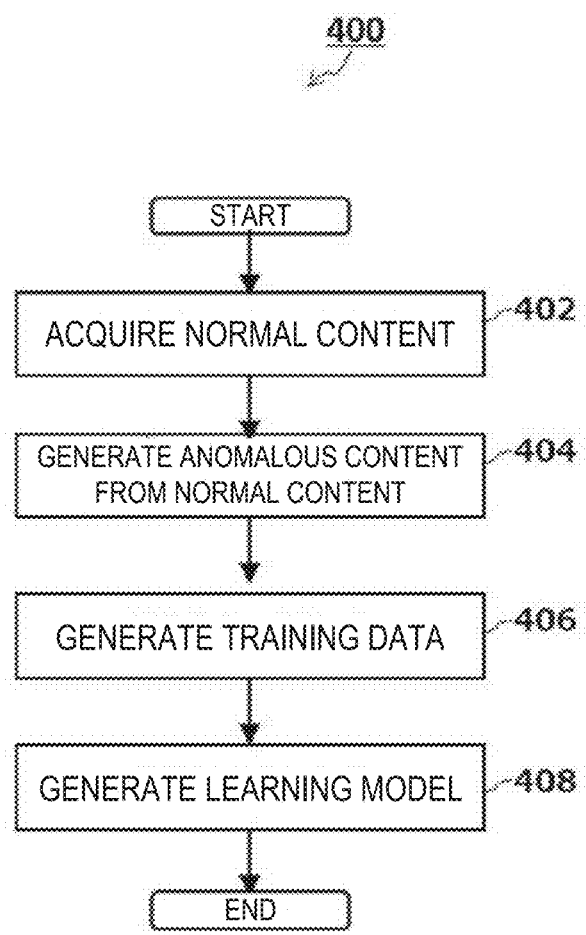
FIG. 4 is a flowchart illustrating operations of the learned model generation device illustrated in FIG. 2.

Hereinafter, an operation flow 400 of the learned model generation device 200 illustrated in FIG. 2, which is in a case where the original content is video content or audio content, will be described by referring to FIG. 4.

In step 402, the normal content acquisition unit 212 acquires normal content from the original content with no anomaly. When giving input data to the learning model, the content may be converted to a form suited for being input to the learning model.

As an example, in a case where the original content is video content, it is extracted every first prescribed period of S seconds (for example, 4 seconds), and the extracted video content is further divided into each frame as still images to acquire normal content. In the meantime, in a case where the original content is a still image, it can be directly used as the normal content without performing such conversion processing.

As another example, in a case where the original content is audio content, it is extracted every first prescribed period of S seconds (for example, 4 seconds) to be the normal content.

Next, in step 404, the anomalous content generation unit 214 generates anomalous content by adding an anomaly to the normal content acquired in step 402. When generating the anomalous content from the normal content, the anomaly may be added automatically to the normal content by using an arbitrary application, the anomaly may be added manually, or the anomaly may be added by both, that is, both by the application and manually. The anomalous content generation method varies between the case where the original content is video content and the case of audio content. Hereinafter, the anomalous content generation method of the case where the original content is the video and that of the case of the audio will be described, respectively.

First, in a case where the original content is the video content, anomalous content is generated by adding an anomaly to the normal content (herein, normal still image). That is, an anomaly is artificially added to the normal still image to acquire the anomalous content. The normal still image is an image recognized as natural when viewed by human beings. The anomalous still image is an image recognized as unnatural when viewed by human beings, which includes an image with a part of or a whole part thereof being distorted, an image with a part thereof being destroyed, an image with a part thereof being deviated, an image with a part thereof being scratched, and the like. The anomalous still image can be generated by randomly adding a digital noise to a normal image or by adding a prescribed noise, for example. The digital noise is at least one selected from a group consisting of various kinds of noises (for example, a block noise, a line noise, an afterimage noise, an image distortion) added by using an arbitrary application and a digital noise added manually. Furthermore, the anomaly added to one piece of anomalous content is not limited to be one kind, but a plurality of kinds of anomalies may be added.

FIG. 10A to FIG. 10D present examples of the normal content and the anomalous content in a case where the normal content is a still image. The images on the upper side of FIG. 10A to FIG. 10D are the normal content, and the images on the lower side are the anomalous content. FIG. 10A presents the normal content (upper side) and the anomalous content (lower side) acquired by adding a block noise to the normal content, FIG. 10B presents the normal content (upper side) and the anomalous content (lower side) acquired by adding deviation (glitch) to the normal content, FIG. 10C presents the normal content (upper side) and the anomalous content (lower side) acquired by adding a line noise to the normal content, and FIG. 10D presents the normal content (upper side) and the anomalous content (lower side) acquired by adding image distortion to the normal content. As presented therein, the anomalous images are recognized as unnatural when viewed by human beings. For those skilled in the art, it is to be understood that various anomalies can be added to the content, and that the anomalies include the afterimage noise, the image distortion, and the like and not limited to those presented in FIG. 10A to FIG. 10D.

In the meantime, in a case where the original content is audio content, anomalous content is generated by adding an anomaly to the normal content (herein, the original content extracted every first prescribed period of S seconds). Specifically, at least one selected from a frequency component (for example, high or low frequency component) that is not supposed to exist therein, a level, and the like is added to the normal content. Normal audio is an audio that sounds natural to human beings. The anomalous audio is an audio sounds unnatural to human beings, which can be generated by randomly adding a digital noise or a prescribed noise to the normal audio, for example. The digital noise is at least one selected from a group consisting of various kinds of noises (for example, a clipping noise, an impulse noise, a continuous sine wave (pure tone), mute (soundless)) added by using an arbitrary application and a digital noise added manually.

Returning to FIG. 4, in step 406, the training data generation unit 216 applies a label ("0" in this example) indicating as being normal to the normal content and applies a label ("1" in this example) indicating as being anomalous to the anomalous content. The training data 234 is generated based on a set of a single piece of labeled normal content and one or more pieces of labeled anomalous content, and saves it in the storage unit 230 (FIG. 3). In order to avoid the so-called overtraining with which precision for unknown data is deteriorated, it is preferable to have a single piece of anomalous content for a single piece of normal content as a pair. That is, when a plurality of pieces of anomalous content are generated from a single piece of normal content, it is preferable to generate the training data 234 by having a single piece of normal content and a single piece of anomalous content among the plurality of pieces of anomalous content as a pair.

The generation method of the training data 234 varies between the case where the original content is the video content and the case of the audio content.

In a case where the original content is the video content, it is also possible to apply a label to the pair of the normal content acquired in step 402 and the anomalous content acquired in step 404 and use it directly as the training data 234.

Figure 11A:
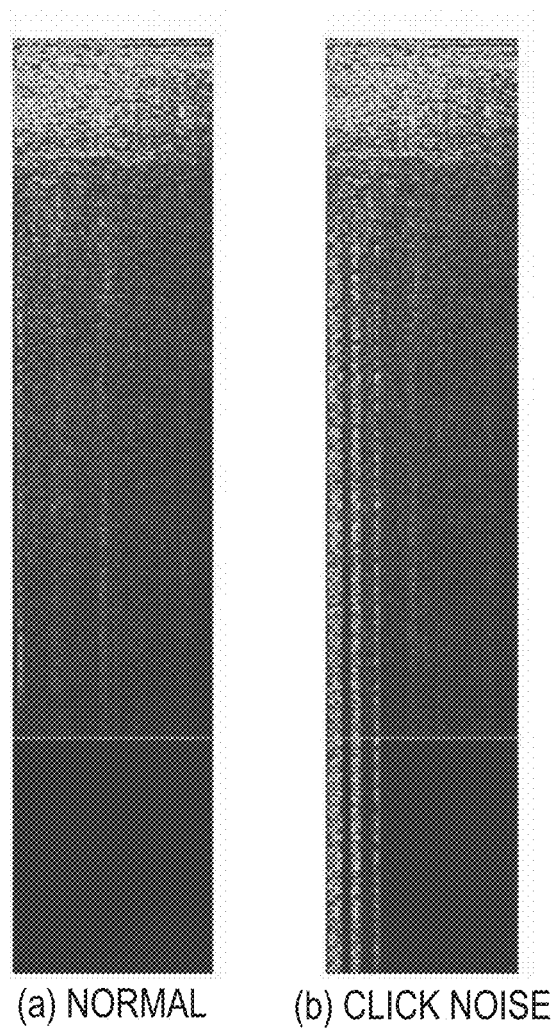
FIGS. 11A-11B are frequency spectrum acquired by performing Fourier transform on normal audio content of the first prescribed period and a frequency spectrum acquired by performing Fourier transform on the normal audio content of the first prescribed period to which an anomaly is added.
Figure 11B:
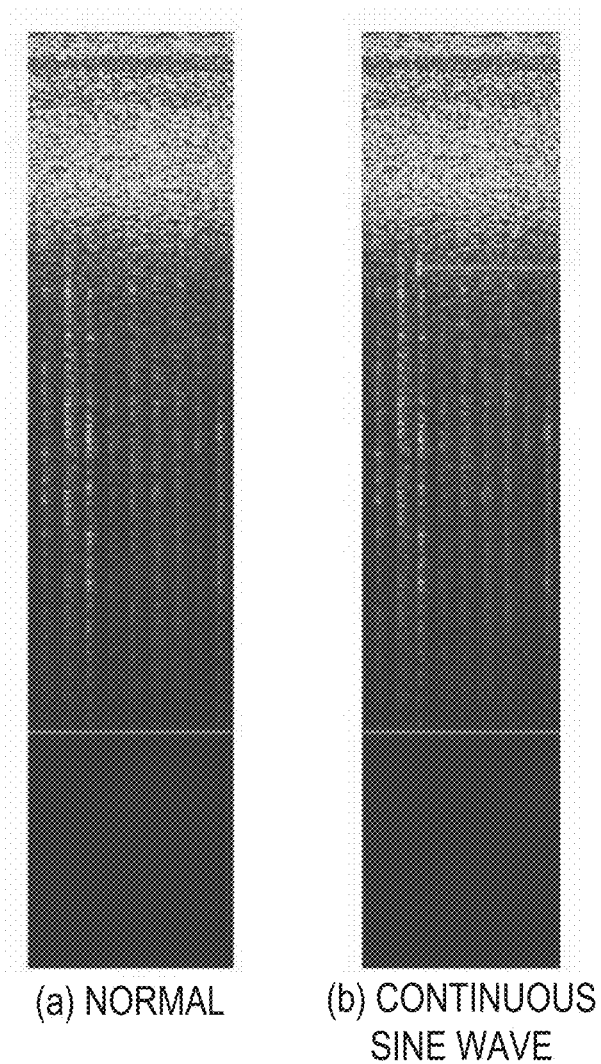

In the meantime, in a case where the original content is the audio content, it is not possible to directly use the normal content and the anomalous content acquired in step 402 and step 404 as the training data 234. Fourier transform or the like is performed on the acquired normal content (anomalous content) to acquire a frequency spectrum, and a label is applied to the frequency spectrum to acquire the training data 234 that corresponds to the normal content (anomalous content). In each of FIG. 11A and FIG. 11B, illustrated are a frequency spectrum ((a) on the left side of the drawing) acquired by performing the Fourier transform on the normal audio content of a first prescribed period (1 second herein) and a frequency spectrum ((b) on the right side of the drawing) acquired by performing the Fourier transform on the normal audio content of the first prescribed period (1 second herein) to which an anomaly is added. The right side (b) of FIG. 11A illustrates the frequency spectrum when a click noise is added as the anomaly, and the right side (b) of FIG. 11B illustrates the frequency spectrum when a continuous sine wave is added as the anomaly. Before performing the Fourier transform (for example, fast Fourier transform, short-time Fourier transform) for easily extracting the feature of the audio content, filtering processing may be performed on the extracted audio content by low-frequency cutoff or by using some kind of other appropriate filters, for example. Furthermore, the features of the audio content may be acquired by performing known MFCC (Mel Frequency Cepstral) analysis or the like, for example. The content acquired as a result of such processing, to which a label is added, may be used as the training data 234 that corresponds to the normal content (anomalous content).

Next, in step 408, the learning unit 218 performs learning by using the training data 234 saved in the storage unit 230. The expected label is compared with the output result calculated by the learning model, and the learning model is modified such that the output result becomes closer to the label. That is, the learning model is modified to output the label "1" indicating as being normal when a normal still image is input, for example, and to output the label "0" indicating as being anomalous when an anomalous still image is input. When the output value reaches the correct answer value after repeating the modification, the learned model 236 is completed. When the final learned model 236 is completed, it is saved in the storage unit 230.

In general, a large amount of labeled data is necessary for performing machine learning. However, labeling work by a person is complicated. According to the present disclosure, it is possible to generate the anomalous content to which an artificially unnatural value is added based on the original content including no anomaly and to automatically apply a label to the generated anomalous content. As a result, it is possible to shorten the time, to lower the cost, or to implement both for the labeling work. Furthermore, in general, it is known that the smaller the number of labels, the higher the precision of the learned model. According to the present disclosure, there are two labels indicating as being normal and being anomalous, so that it is possible to acquire the determination result of being normal or anomalous with high precision.

Furthermore, according to the present disclosure, the anomalous content is generated based on the original data including no anomaly, so that it is easy to prepare a large number of pieces of anomalous content for a single piece of normal content. With the present disclosure, it is not necessary to prepare an anomalous item as an article for a normal item as an article and to acquire captured images thereof. According to the present disclosure, it is possible to prepare a large number of pieces of anomalous data without preparing anomalous items as the articles. As a result, a large number of combinations of the normal content and the anomalous content corresponding thereto can be prepared. Therefore, the number of pieces of training data is increased than that of a case of learning performed by using a single combination. This makes it possible to increase the precision and efficiency of learning. Furthermore, since learning can be performed with high precision when there are a large number of pairs, it is possible to greatly reduce the number of pieces of original content that includes no anomaly.

Figure 5:
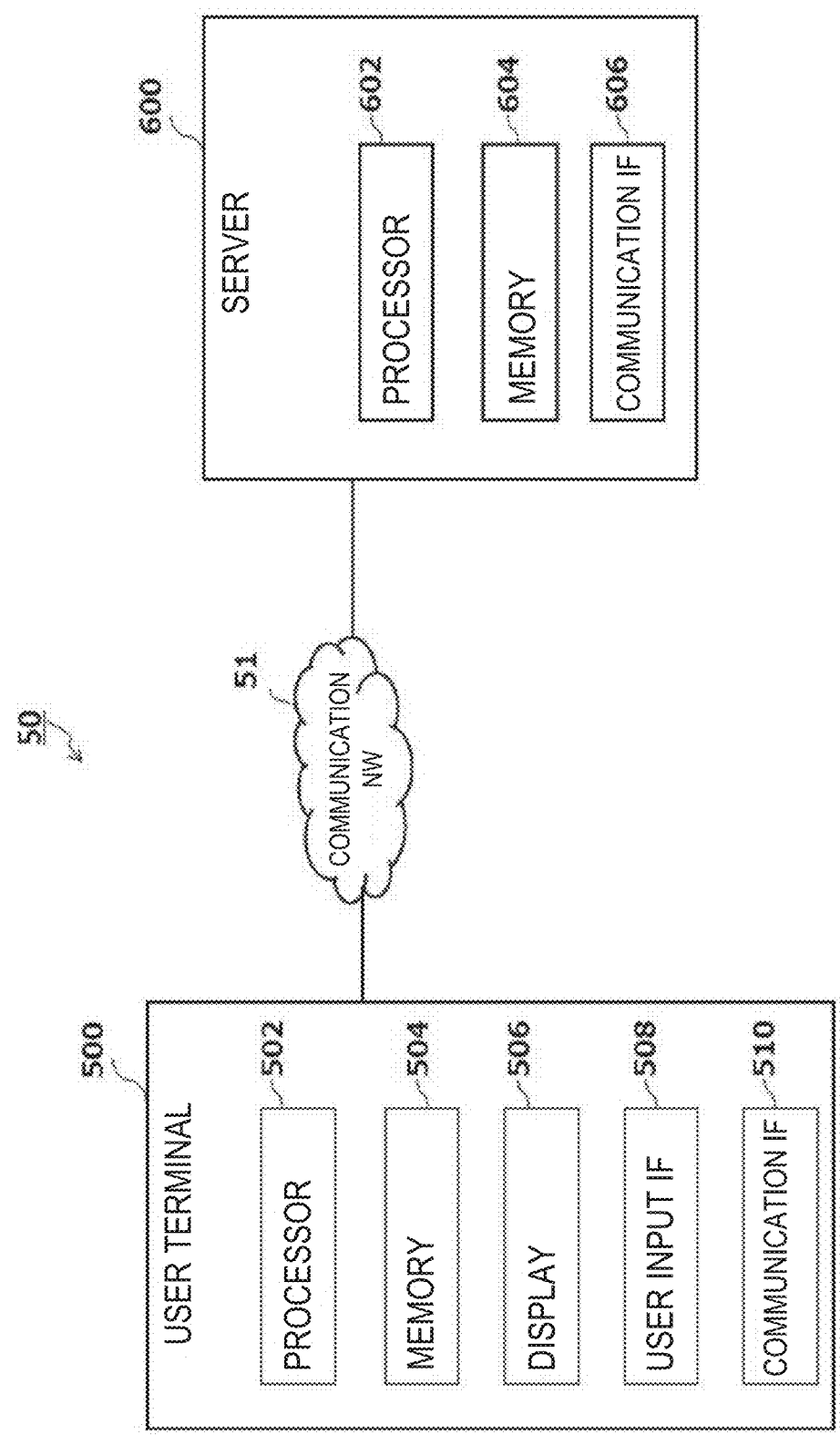
FIG. 5 is a block diagram illustrating a configuration of an inference system according to an embodiment of the present disclosure for performing an inference phase of the content anomaly inspection method illustrated in FIG. 1.

FIG. 5 illustrates the configuration of an inference system 50 for performing the inference phase (b) of the content anomaly inspection method illustrated in FIG. 1. The inference system 50 includes a user terminal 500 and a server 600, each of which can be implemented by an arbitrary information processing device. The user terminal 500 is a terminal with which the user uploads the inspection target on the server 600, and checks whether there is an anomaly in the inspection target on an application screen where display based on the inference result received from the server 600 is presented. The server 600 is a computer that infers whether there is an anomaly in the inspection target. The user terminal 500 and the server 600 are connected to be able to communication with each other via a communication network (NW) 51. The communication network 51 may be any type of network such as the Internet, LAN (Local Area Network), or the like, for example. While there is only a single user terminal 500 illustrated in FIG. 5, the inference system 50 may include any number of user terminals each being used by a different user. Furthermore, while there is only a single server 600 illustrated in FIG. 5, the server 600 may be configured with a plurality of servers or may be configured in a cloud.

As illustrated, the user terminal 500 includes a processor 502, a memory 504, a display 506, a user input interface (user input IF) 508, and a communication interface (communication IF) 510 as the main hardware components. Each of those components is connected to be able to communicate with each other via a bus (not illustrated). The user terminal 500 can be implemented by a smartphone, a tablet terminal, a personal computer, or the like, for example. Hereinafter, detailed explanations of the components same as the those already described above may be omitted.

In the memory 504, at least an operating system and a terminal-side program for executing an inference program are stored. The terminal-side program is a computer program for implementing functions of the processing for receiving input from the user and uploading the inspection-target content 106 to the server 600 and functions of the processing for receiving the inference result for the inspection target, and the like. The memory 504 may also store the inspection-target content 106.

A part of the memory 504 may be provided separately on the outside of the user terminal 500 main body. In that case, the inspection-target content 106 is stored in the separate external memory (not illustrated). The user terminal 500 can make an access to the external memory, and upload the inspection-target content 106 to the server 600 from the external memory via the communication network 51 in accordance with an instruction from the user terminal 500. Therefore, the inspection-target content 106 may not need to be stored in the memory inside the user terminal 500.

The display 506 is configured to provide visual information to the user of the user terminal 500. For example, the display 506 displays a plurality of icons for starting various applications on a home screen or a desktop screen of the operating system of the user terminal 500 stored in the memory 504. The display 506 further displays a result image generated as a result of the inference processing on an execution screen of a client program.

The user input interface 508 is configured to receive input from the user for operating the user terminal 500. Specific examples of the user input interface 508 include a touch pad, a mouse, a keyboard, and the like.

In a case where the user terminal 500 is implemented as a smartphone or a tablet terminal, the display 506 and the user input interface 508 may be integrally configured as a touch panel. Furthermore, in a case where the user terminal 500 is implemented as a personal computer, the display 506 and the user input interface 508 may be provided separately on the outside of the user terminal 500 main body.

The communication interface 510 is a network interface for communicating with the server 600 via the communication network 51. The communication interface 510 may be configured to transmit/receive data to/from the server 600 according to a prescribed communication protocol including TCP/IP (Transmission Control Protocol/Internet Protocol), for example.

FIG. 5 further illustrates a hardware block diagram of the server 600. The server 600 includes a processor 602, a memory 604, and a communication interface (IF) 606 as the main hardware components. Each of those components is connected to be able to communicate with each other via a bus (not illustrated). Hereinafter, detailed explanations of the components same as the those already described above may be omitted.

In the memory 604, a server program is stored in addition to an operating system that controls overall operations of the server 600. The server program is a computer program for causing the server 600 to execute each processing on the server side related to execution of the inference processing. By executing the inference program stored in the memory 604 with the processor 602, each of the functions on the server side to be described later is implemented.

The communication interface 606 is a network interface for communicating with (a single or a plurality of) user terminal 500 via the communication network 51.

Figure 6:
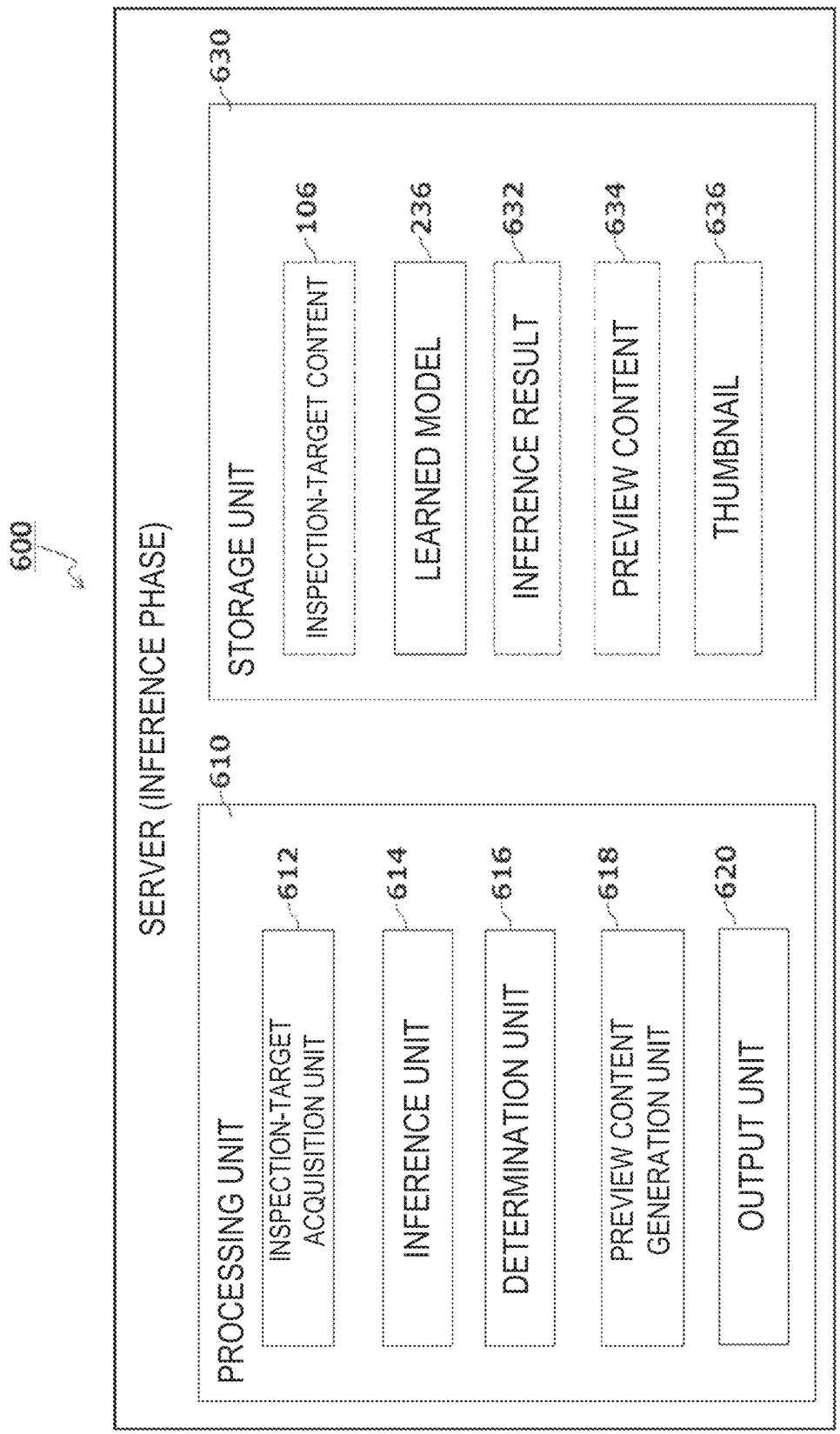
FIG. 6 is a block diagram illustrating a functional configuration of a server included in the inference system illustrated in FIG. 5.

FIG. 6 is a block diagram illustrating a functional configuration of the server 600 that configures a part of the inference system illustrated in FIG. 5. The server 600 includes a processing unit 610 and a storage unit 630. The processing unit 610 includes an inspection-target acquisition unit 612, an inference unit 614, a determination unit 616, a preview content generation unit 618, and an output unit 620. The storage unit 630 corresponds to the memory 604 illustrated in FIG. 5. The storage unit 630 includes the inspection-target content 106, the learned model 236, an inference result 632 acquired by the learned model 236, preview content 634 including a section inferred as an anomaly, and a thumbnail 636 of the preview content 634. The processing unit 610 and each of the units 612 to 620 included in the processing unit 610 are the functions implemented by the inference processing according to the present disclosure, which are implemented by the processor 602 illustrated in FIG. 5 by reading out and executing the program in the memory 604.

Figure 7:
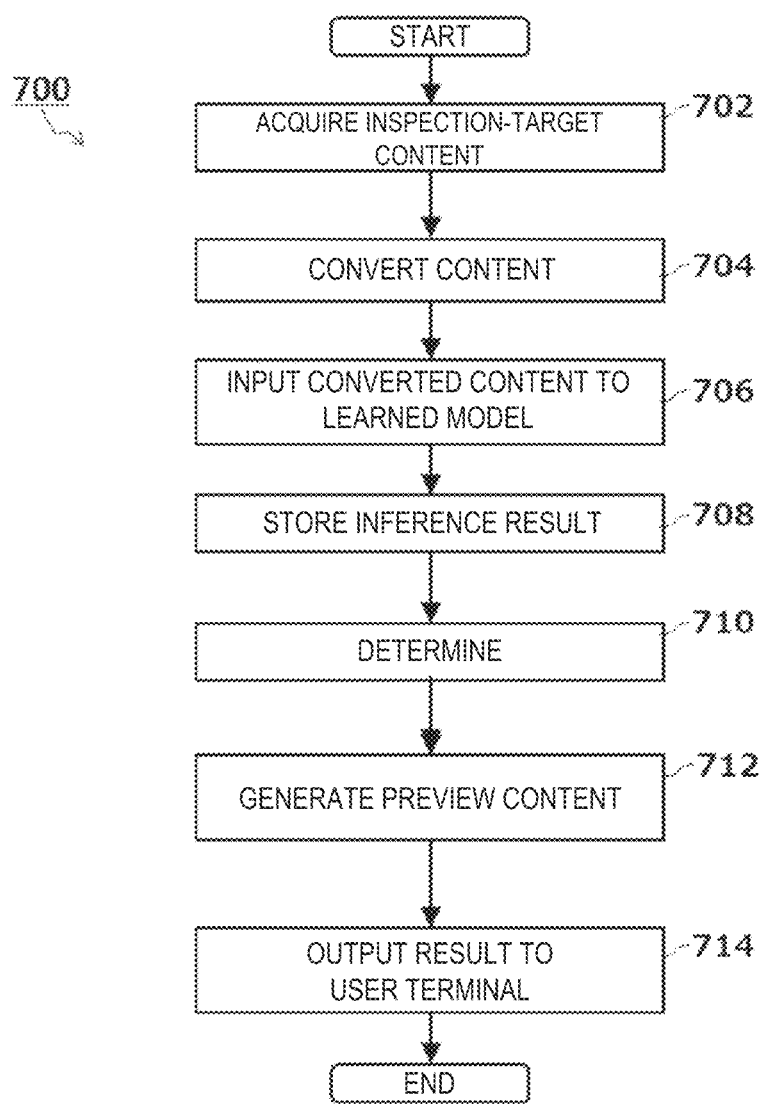
FIG. 7 is a flowchart illustrating operations of the server illustrated in FIG. 6.

Hereinafter, an operation flow 700 of the server 600 illustrated in FIG. 6, which is in a case where the inspection target is video content or audio content, will be described by referring to FIG. 7. Prior to the execution of the processing of the operation flow 700 illustrated in FIG. 7, the learned model 236 is stored in advance in the storage unit 630.

In step 702, the inspection-target acquisition unit 612 acquires the unlabeled inspection-target content 106 that is uploaded to the server 600 by the user terminal 500.

Next, in step 704, the inspection-target acquisition unit 612 converts the acquired inspection-target content 106 to a form suited for being input to the learned model 236. In a case of the video content, the content of the first prescribed period of S seconds (for example, 4 seconds) is extracted from the inspection-target content 106, and the extracted content is divided into each frame to acquire a plurality of pieces of still image content. In a case of the audio content, the content of the first prescribed period of S seconds is extracted, and the Fourier transform or the like is performed on the extracted audio content to acquire the content indicating the frequency spectrum of the audio content.

Next, in step 708, the inference unit 614 inputs the content converted in step 704 to the learned model 236 to acquire the inference result 632 (values of 0 to 1 herein), and stores each thereof to the storage unit 630.

In step 710, the determination unit 616 acquires the inference result 632 from the storage unit 630, aligns it in time series, and determines whether the inference result 632 is less than a prescribed threshold value such as 0.99, for example. When the output result is less than the prescribed threshold value, the determination unit 616 determines as being normal. In the meantime, when not less than the prescribed threshold value, it is determined that there is an anomaly in the inspection-target content 106.

In next step 712, the preview content generation unit 618 finds the operation center point of the preview content from the aligned inference result 632. The preview content generation unit 618 extracts a part of the content inferred to have an anomaly as the preview content 634 so as to be able to check whether there is any anomaly in the inspection-target content 106 without checking the entire inspection-target content 106. When a plurality of inference results indicating as having an anomaly exist intermittently in a single piece of the inspection-target content 106, the preview content generation unit 618 generates the preview content 634 for each of the anomalous sections.

An example of the procedures for finding the operation center point of the preview content by the preview content generation unit 618 is as follows. The preview content generation unit 618 first acquires the aligned inference result of the first prescribed period of S seconds. Then, for the acquired inference result, following processing of 1 to 5 is performed.

1. First, among the inference result of the first prescribed period of S seconds, the value that is equal to or larger than a threshold value and closest to "1", or "1" is searched.
2. When there is no "1" in the inference result, the frame to which the value closest to "1" is associated is defined as the operation center point.
3. When there is "1" in the inference result, the frame to which "1" is associated is defined as the operation center point.
4. When the inference result indicating an anomaly, in which the inference result equal to or larger than the prescribed threshold value continuously appears, the center frame among the corresponding continuous frames is defined as the operation center point.
5. When there are a plurality of centers in the inference result within the first prescribed period of S seconds, the foremost center is defined as the operation center point.

The preview content generation unit 618 extracts the operation center point found by the procedures of 1 to 5 and the content over a second prescribed period of T seconds (for example, 3 seconds) before and after the operation center point from the inspection-target content 106, and stores those in the storage unit 630 as the preview content 634. When the preview content 634 is reproduced, the user may visually recognize the content inferred to have no anomaly over the second prescribed period of T seconds, then may visually recognize the content inferred to have an anomaly and, thereafter, may visually recognize the content inferred to have no anomaly over the second prescribed period of T seconds. This makes it easier for the user to compare the anomalous part and the normal part when checking the preview content 634. In a case where the inference result indicating as having an anomaly continuously appears, the content may be extracted over the second prescribed period of T seconds before and after the continuous periods from the inspection-target content 106.

For the entire inspection-target content 106, content conversion processing (step 704), inference processing (step 706, step 708), determination processing (step 710), and preview content generation processing (step 712) are repeatedly performed. After such processing is completed for the entire inspection-target content 106, the processing is shifted to step 714.

In step 714, the output unit 620 transmits the generation time of the anomaly section, the preview content 634, and the inference result associated with the preview content 634 to the user terminal 500 via the communication interface 606.

Referring to FIG. 8, an example of a screen 800 displayed on the display 506 of the user terminal 500 will be described. The user terminal 500 displays the received preview content 634 and the like on the display 506.

Note that "802" indicates the number allotted to the section that is extracted from a single piece of the inspection-target content 106 and inferred to have a plurality of anomalies. In this embodiment, it is determined to have anomalies in three sections (anomalous section 1, anomalous section 2, anomalous section 3). The display screen 800 may be configured to display the anomalous sections regarding a plurality of pieces of the inspection-target content 106 at once.

Note that "804" indicates the generation time of the section determined to have an anomaly. For example, the anomalous section 1 is inferred to be generated after 1 minute and 36 seconds from the start of reproduction of the inspection-target content 106.

Note that "806" indicates the thumbnail 636 of the preview content 634. Upon receiving a click or a tap on the thumbnail 636 by the user, the user terminal 500 pops up a screen (not illustrated) on the display 506. The user can reproduce the preview content 634 including the anomalous section on the popup screen. When the preview content 634 is reproduced, the section inferred as being anomalous is reproduced after the normal section is reproduced over the second prescribed period of T seconds (for example, 3 seconds), and then the normal section is further reproduced over the second prescribed period of T seconds.

Note that "808" indicates the probability that the section inferred as being anomalous is actually anomalous, which is referred to as "confidence". The confidence is the inference result (more precisely, value acquired by multiplying the inference result by 100) from the learned model 236 acquired by the inference unit 614 in step S706. The inference result 632 indicates the probability that the content as the inspection target includes an anomaly. For example, when the inference result is "1", the frame corresponding to the inference result is 100% anomalous. When "0.1", the probability that the frame corresponding to the inference result is anomalous is 10%. The inference result associated with the frame designated as the operation center point is considered as the confidence. In the embodiment, the probability that the anomalous section 1 includes an anomaly, that is, the confidence, is 99.31%. In the present disclosure, the confidence of 99% (the value acquired by multiplying the threshold value 0.99 by 100) or more is determined to have an anomaly.

Figure 9:
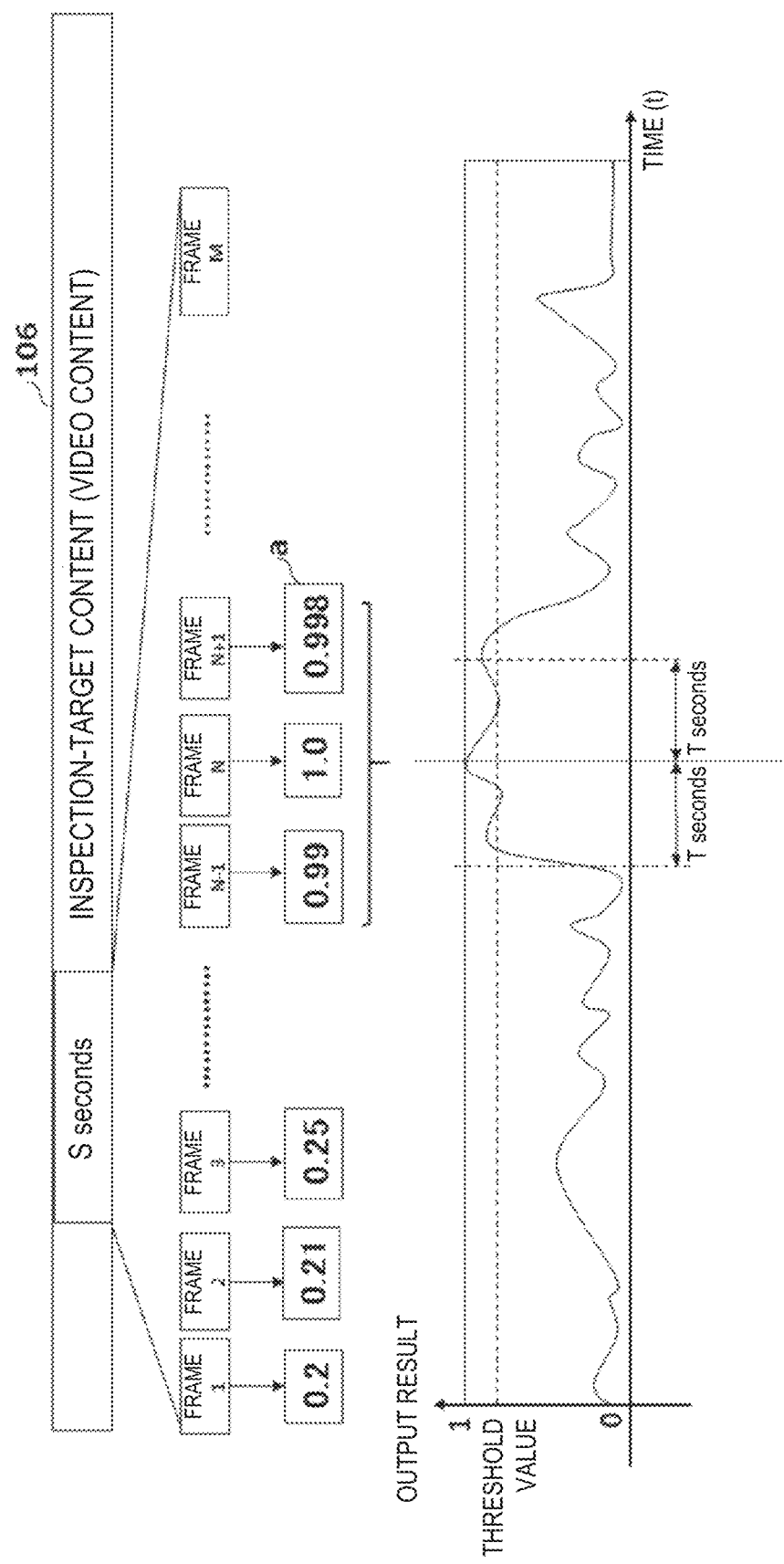
FIG. 9 is a chart illustrating a state where video content acquired every first prescribed period is divided into M-pieces of frames.

Next, by referring to FIG. 9, described is the relation in regard to the inference result "a", each of the frames, and the threshold value in a case where the inspection-target content 106 is the video content.

FIG. 9 illustrates a state where the video content of S seconds acquired every first prescribed period of S seconds (4 seconds) is divided into M-pieces of frames. For example, in a case where the first prescribed period S is 4 seconds and the frame rate is 30 fps, 120 (=M) frames are generated.

FIG. 9 also illustrates the inference results acquired for each of the frames by inputting all 120 frames to the learned model 236. In FIG. 9, the inference result "a" is 0.2 in the frame 1, 0.21 in the frame 2, 0.99 in the frame N−1, 1.0 in the frame N, and 0.998 in the frame N+1. Assuming here that the threshold value is 0.99, the determination unit 616 determines that the frame N−1, the frame N, and the frame N+1 have an anomaly since those frames are not less than the threshold value.

By having the frame N determined to have an anomaly as the center, the preview content generation unit 618 extracts the content over the second prescribed period T (3 seconds) before and after the time of the frame N as the preview content 634, and stores the preview content 634, the time of determination of an anomaly, and the inference result to the storage unit 630. Furthermore, the preview content generation unit 618 generates the thumbnail 636 from the extracted preview content 634, and stores it to the storage unit 630.

According to the present disclosure, it is preferable to have the high probability, that is, 100% probability for being able to detect the inspection-target content including an anomaly. Therefore, the threshold value is adjusted (the threshold value is set as 0.99 in the present disclosure) so that, in regard to the content inferred to have no anomaly, it is possible to avoid mistakenly inferring to have no anomaly even though an anomaly is actually being included. Thereby, the content that includes an anomaly can be securely detected, while the probability of determining the normal content as having an anomaly may be increased. That is, according to the present disclosure, the threshold value is adjusted so as to avoid misdetection that results in overlooking the content including an anomaly.

While the embodiments of the present disclosure have been described above, the embodiments of the invention are for easily understanding the present invention, and are not intended to limit the scope thereof. While the examples of the case where the inspection target is video content and audio content as broadcasting signals from a broadcasting station have been described in the embodiments, not only the broadcasting signals but also any kind of content distributed via a network such as the Internet can be the inspection target. Furthermore, as described above, any type of devices or signals and the like related to those devices can be the inspection target, so that image content such as video, still image, and the like regarding those devices as well as audio content such as the sound generated from the devices can be used as the inspection target. In that case, the inspection target may also be signals acquired from sensors and the like attached to the devices.

As an example, the original content including no anomaly is the signals acquired from various kinds of sensors (an acceleration sensor, an angular velocity sensor, a temperature sensor, a barometric pressure sensor, a flow rate sensor, a luminance sensor, and the like) that monitor various kinds of devices operating properly, for example. From the original content, normal content and anomalous content are generated. The processing in the learning phase of the signals acquired from the sensors and the like and the processing in the inference phase thereof are the same as the processing of the case of the audio content.

According to the present disclosure, when a machine in operation breaks down, it is possible to detect an anomaly of the machine occurred in the past from the recorded machine sound. The operation sound of the machine in the normal operation is recorded, and normal content is generated therefrom. Training data is generated based on the normal content and anomalous content acquired by adding an anomaly to the normal content. A learned model is generated from the generated training data. The anomaly of the machine occurred in the past is detected by using the learned model.

Alternatively, as another example, when a machine in operation breaks down, it is also possible to detect an anomaly of the machine occurred in the past from the recorded data from various kinds of sensors. The data from the various kinds of sensors in the normal operation is recorded, and normal content is generated therefrom. Training data is generated based on the normal content and anomalous content acquired by adding an anomaly to the normal content. A learned model is generated from the generated training data. The anomaly of the machine occurred in the past is detected by using the learned model.

While various illustrative aspects and embodiments have been described above in detail, various modifications, substitutions, additions, and sub-combinations will occur to those skilled in the art. Accordingly, claims set forth in the appended claims and claims that may be included in future are intended to be understood that any such modifications, substitutions, additions, sub-combinations, and the like that fall within the true scope are also encompassed by the claims.

REFERENCE SIGNS LIST

50 Inference system
51 Communication network
106 Inspection-target content
200 Information processing device
210 Processing unit
212 Normal content acquisition unit
214 Anomalous content generation unit
216 Training data generation unit
218 Learning unit
230 Storage unit
232 Original content
234 Training data
236 Learned model
500 User terminal
510 Communication interface
600 Server
612 Inspection-target acquisition unit
614 Inference unit
616 Determination unit
618 Preview content generation unit
620 Output unit
630 Storage unit
632 Inference result
634 Preview content
636 Thumbnail

The invention claimed is:

1. A method for determining whether inspection-target content as an inspection target includes an anomaly, the method comprising:
    giving the inspection-target content as input data to a learned model for determining whether the inspection-target content is normal or anomalous, the learned model being generated by using a set of normal content and one or more pieces of anomalous content generated from the normal content, and information indicating whether the content is normal or anomalous as training data; and
    acquiring information indicating normal/anomaly of the inspection-target content from the learned model to which the inspection-target content is given, wherein the information indicating normal/anomaly of the inspection-target content includes generation time of a noise in the inspection-target content and a probability of the inspection-target content having an anomaly.

2. The method according to claim 1, further comprising:
    determining that the inspection target includes an anomaly when the probability of the inspection-target content having the anomaly is equal to or more than a threshold value, wherein the threshold value is adjusted so as not to mistakenly determine that the inspection-target content has no anomaly even though the inspection-target content actually includes an anomaly.

3. A non-transitory recording medium recording a program to be executed by a processor, the processor executing the program recorded in the recording medium to:
    give inspection-target content as input data to a learned model for determining whether the inspection-target content is normal or anomalous, the learned model being generated by using a set of normal content regarding an inspection target and one or more pieces of anomalous content generated from the normal content, and information indicating whether the content is normal or anomalous as training data; and
    acquire information indicating normal/anomaly of the inspection-target content from the learned model to which the inspection-target content is given, wherein the information indicating normal/anomaly of the inspection-target content includes generation time of a noise in the inspection-target content and a probability of the inspection-target content having an anomaly.

4. The method according to claim 1, further comprising:
    acquiring a probability of the inspection-target content having an anomaly in a first prescribed period aligned in time series; and
    finding a period where the acquired probability of the inspection-target content having the anomaly is equal to or more than a threshold value and the acquired probability of the inspection-target content having the anomaly becomes a value closest to a value indicating that the inspection-target content is anomalous.

5. The method according to claim 4, further comprising:
    extracting, as preview content, content over a second prescribed period before and after an operation center point that is the center of the period where the probability of the inspection- target content having the anomaly becomes the value closest to the value indicating that the inspection-target content is anomalous.

* * * * *